United States Patent
Friedersdorf et al.

[19]

[11] Patent Number: 6,138,374
[45] Date of Patent: Oct. 31, 2000

[54] APPARATUS FOR MEASURING COATING THICKNESS ON A SUBSTRATE AND METHOD THEREOF

[75] Inventors: Fritz J. Friedersdorf, Hellertown; George E. Donchez, Allentown, both of Pa.

[73] Assignee: Bethlehem Steel Corporation

[21] Appl. No.: 09/149,990

[22] Filed: Sep. 9, 1998

[51] Int. Cl.$^7$ .................................................. G01B 5/06
[52] U.S. Cl. ........................ 33/834; 33/833; 33/832; 33/573; 33/567.1; 269/74; 269/76
[58] Field of Search ......................... 33/783, 832, 833, 33/834, 531, 567, 567.1, 573; 73/150; 269/74, 76, 79, 297

[56] References Cited

U.S. PATENT DOCUMENTS

| | | | |
|---|---|---|---|
| 1,079,697 | 11/1913 | Flett | 269/297 |
| 1,503,795 | 8/1924 | Martin | 269/297 |
| 1,909,652 | 5/1933 | Bower . | |
| 1,927,821 | 9/1933 | Abbott | 33/172 |
| 1,954,708 | 4/1934 | Mass | 269/297 |
| 1,973,803 | 9/1934 | Frauen | 269/297 |
| 2,136,675 | 11/1938 | Danse | 33/834 |
| 2,290,170 | 7/1942 | Dieffenbach | 73/150 |
| 2,365,436 | 12/1944 | Saucier | 269/76 |
| 2,507,592 | 5/1950 | Euverard | 33/125 |
| 2,546,990 | 4/1951 | Euverard et al. | 33/125 |
| 2,814,122 | 11/1957 | Euverard | 33/169 |
| 3,062,529 | 11/1962 | Hiller | 269/297 |
| 3,171,211 | 3/1965 | Parkes et al. | 33/170 |
| 3,340,615 | 9/1967 | Tooke | 33/125 |
| 3,423,837 | 1/1969 | Euverard | 33/169 |
| 3,820,247 | 6/1974 | Casey et al. | 33/567.1 |
| 4,235,018 | 11/1980 | Saberg | 33/169 |
| 4,383,682 | 5/1983 | Feinberg | 269/76 |
| 4,522,380 | 6/1985 | Peddle | 269/74 |
| 4,531,720 | 7/1985 | Soder | 269/76 |
| 4,941,269 | 7/1990 | Mori et al. | 33/783 |
| 5,234,295 | 8/1993 | Jackson et al. | 33/567 |
| 5,575,075 | 11/1996 | Sasaki | 33/832 |
| 5,735,055 | 4/1998 | Hochbein et al. | 33/783 |
| 5,929,633 | 7/1999 | Fischer | 33/834 |

FOREIGN PATENT DOCUMENTS

| | | | |
|---|---|---|---|
| 0107510 | 6/1985 | Japan | 33/834 |
| 1021995 | 6/1983 | U.S.S.R. | 33/834 |
| 1427163 | 9/1988 | U.S.S.R. | 33/834 |
| 1430723 | 10/1988 | U.S.S.R. | 33/834 |

OTHER PUBLICATIONS

Technical Bulletin "Coating Weight and Thickness Designations for Coated Steel Sheets" Copyright 1995 Bethlehem Steel Corporation.

Paul N. Gardner Company, Inc., 1994 Edition, pp. 666–677.

ASTM Designation: D 5796–95 Standard Test Method for Measurement of Dry Film of Thin Film Coil–Coated Systems by Destructive Means Using a Boring Device.

Primary Examiner—Diego Gutierrez
Assistant Examiner—Yaritza Guadalupe
Attorney, Agent, or Firm—Harold I. Masteller, Jr.

[57] ABSTRACT

The invention is directed to a method and apparatus for determining coating thickness on a substrate. The apparatus comprises a jig and fixture combination where the jig includes a moveable stop that fixes a position for placing a substrate specimen in the fixture, and where the fixture includes an inclined plane for receiving the substrate specimen at a predetermined angle θ that slopes in a downward direction to engage the moveable stop. A clamp that holds the substrate specimen at a fixed position against moveable stop and inclined plane when said fixture is separated from said jig to determine coating thickness on the substrate. The method for determining coating thickness using the combination jig and fixture arrangement includes placing and clamping a substrate specimen at a predetermined position in the fixture in response to a bound fixed by the moveable stop of the jig, grinding a measuring surface along a portion of the substrate specimen that is clamped in the fixture, and repositioning the substrate specimen to place the measuring surface prepared by grinding in a plane parallel to the focal plane of a measuring device used to determine coating thickness.

21 Claims, 5 Drawing Sheets

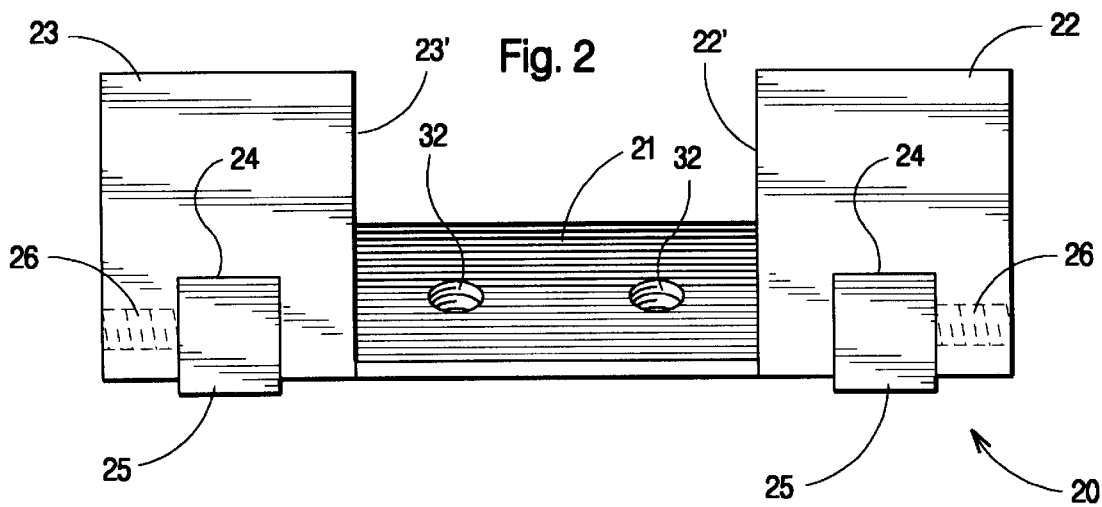
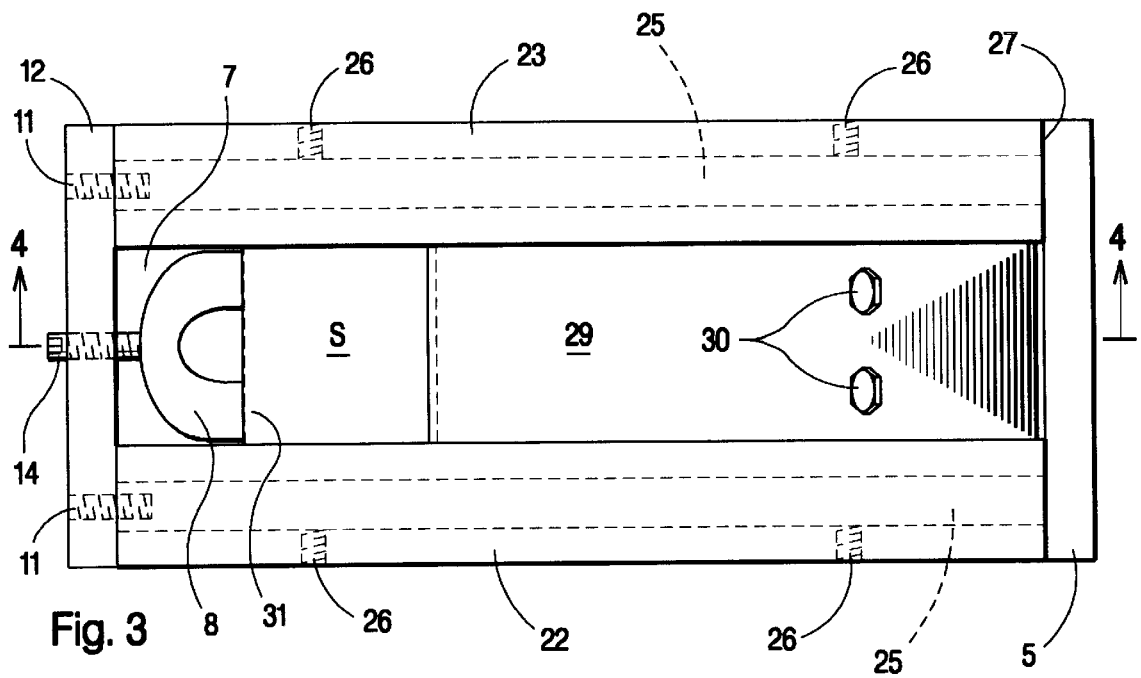
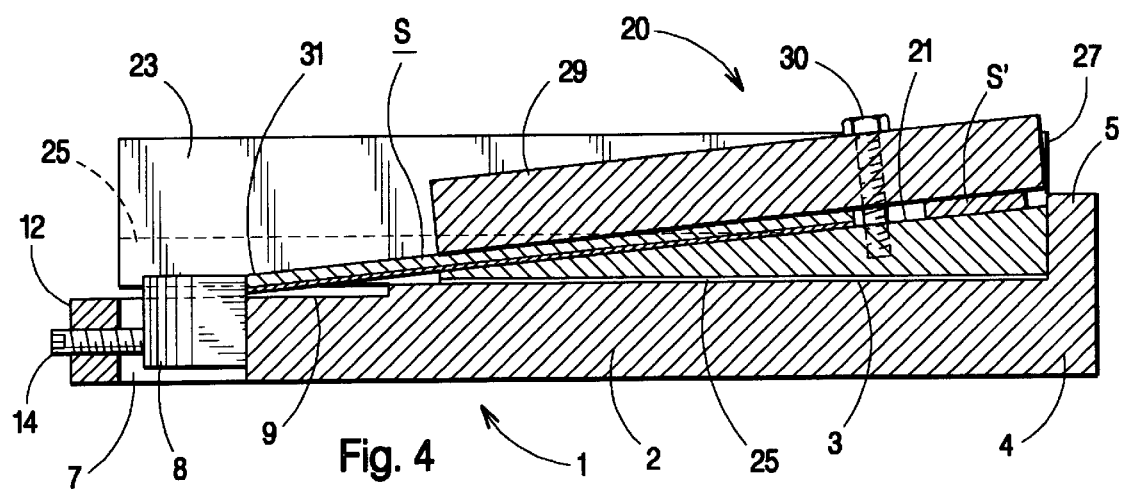

APPARATUS FOR MEASURING COATING THICKNESS ON A SUBSTRATE AND METHOD THEREOF

BACKGROUND OF THE INVENTION

This invention is directed to apparatus and a method for determining coating thickness on a substrate, and in particular, it is directed to apparatus and a method for measuring organic and metallic coatings applied to the surface of a steel sheet or strip.

Protective coatings are applied to steel sheet and strip to prevent corrosion. Numerous different surface coatings have been developed to improve both the corrosion resistance and the appearance of steel products. For example metallic coatings, such as zinc and zinc-alloy coatings, are very effective and economical coatings for improving the corrosion resistance of a steel sheet or strip. Such coatings are applied directly to the surface of the steel strip by either electrochemical process or by hot-dipping the strip into a molten zinc bath. Although the primary purpose of metallic coatings is to prevent corrosion of the steel substrate, they can also be used for their decorative features to improve the surface appearance of steel product. For instance, galvanized sheets are often manufactured with a pleasing spangled surface. This produces a product having a bright appearance associated with a high quality steel sheet.

Organic coatings, on the other hand, are primarily used to improve surface appearance. Prepainted steel sheet and strip products are aesthetically pleasing to the eye when they are formed into a finished product. Organic coatings can also improve the durability of steel products. For example, prepainted Galvalume® sheet used in residential roofing exhibits long-term durability when exposed to our modern outdoor atmosphere that has become increasingly corrosive due to acid rain. Organic coatings are typically in the form of paint systems applied as primers and topcoats directly on top of the metallic coating chemically bonded to the steel substrate. Such organic coatings include enamels, acrylics, epoxies, and the like, and they include different hues to achieve a variety of desired surface appearances.

Steelmakers produce many different prepainted steel sheet products that meet the needs of customer products. To illustrate, prepainted Galvalume consists of 55% aluminum, 43.4% zinc and 1.6% silicon alloy chemically bonded to a steel substrate. An outer paint system comprising polyesters, silicone polyesters, fluorocarbons, plastisols, or the like, is applied directly to the surface of the Galvalume coating. Such prepainted sheets are used in architectural and home product applications for their pleasing appearance. Similarly, a prepainted zinc-nickel coated steel sheet product is manufactured by steel producers for use in fuel tank applications for the automotive industry. In this instance, the finished product comprises a composite material having a zinc-nickel alloy coating bonded to the surface of the steel sheet, and an organic coating comprising an aluminum rich epoxy paint applied as a topcoat.

Because end users of coated steel sheet and strip demand long-term durability in their finished products, it is extremely important to apply protective coatings at specified coating weights to achieve expected product life. Failure to apply a proper coating weight, or coating thickness, can result in premature failure of a customer's finished product due to a breakdown of the barrier protection offered by the metallic coatings and/or the paint systems. Therefore, there has been a long felt need within the coating industry for a device that allows operators to quickly and accurately measure coating thickness on their finished steel sheet and strip products to determine whether the product meets a customer's specification. Such thickness information allows operators to adjust the coating line based on the measurement results.

One such device for measuring coating thickness is disclosed in U.S. Pat. No. 3,340,615 granted to Tooke. Tooke discloses forcing a cutting tool through a film on a substrate to cut a groove into the film. The cut groove has at least one side inclined at a predetermined angle, for example 45°, and the film thickness is determined by viewing the 45° inclined surface from above with a microscope. The microscope has a calibrated reticle that converts the 45° slope measurement directly into the length of the sides of a 45° triangle (the film thickness).

Tooke has partially met the long felt need within the industry by providing operators with a simple film-measuring device that, somewhat accurately, allows operators to spot check coating thickness for quality control. However, because present day steel users demand thin gauge steel sheet and strip in their finished products to reduce both weight and cost, modern coating requirements demand even more accurate measurement techniques to spot check coating line quality. Thin gauge steels make it very necessary to insure that proper coating weights are applied to a steel substrate in order to prevent premature product failure due to the breakdown of barrier protection. When a cutting tool is forced through an organic coating as taught by Tooke, the blade motion through the coating causes plastic deformation and elastic springback along the tool path. In the instance of a metallic coating, such as a zinc or a zinc alloy coating, the blade motion causes permanent plastic deformation of the alloy along the cut. Such distortion along the cut prevents accurate measurement of coating thickness and can mislead operators running coating lines.

It has been discovered that grinding, rather than cutting with a tool, eliminates or minimizes elastic springback and the zone of plastic deformation, and therefore, grinding a measuring surface provides a more accurate determination of coating thickness.

SUMMARY OF THE INVENTION

It is therefore an object of this invention to provide an improved method for more accurately determining coating thickness on a substrate.

It is a further object of this invention to provide an improved method for determining coating thickness where the method eliminates or reduces the zone of plastic deformation along the measuring surface.

It is still a further object of this invention to provide a method for determining coating thickness that includes wet or dry grinding a measuring surface to eliminate or reduce the zone of plastic deformation along the measuring surface.

It is still another object of this invention to provide apparatus for determining coating thickness that accurately positions and holds in a grinding position, a specimen being prepared for measurement.

It is still a further object of this invention to provide apparatus for determining coating thickness that accurately positions and holds in a measuring position, a specimen having a surface prepared for measurement.

It is still another object of this invention to provide apparatus for determining coating thickness that holds a prepared measuring surface in a plane parallel to the focal plane of a measuring device.

In satisfaction of the foregoing objects and advantages, the present invention provides a method and apparatus for determining coating thickness on a substrate. The apparatus comprises a jig and fixture combination where the jig includes a moveable stop that fixes a position for placing a substrate specimen in the fixture, and where the fixture includes an inclined plane for receiving the substrate specimen at a predetermined angle θ that slopes in a downward direction to engage the moveable stop. A clamp holds the substrate specimen at a fixed position against the moveable stop and inclined plane when said fixture is separated from said jig to determine coating thickness on the substrate. The method for determining coating thickness using the combination jig and fixture arrangement includes placing and clamping a substrate specimen at a predetermined position in the fixture in response to a bound fixed by the moveable stop of the jig, grinding a measuring surface along a portion of the substrate specimen that is clamped in the fixture, and repositioning the substrate specimen to place the measuring surface prepared by grinding in a plane parallel to the focal plane of a measuring device used to determine coating thickness.

BRIEF DESCRIPTION OF THE DRAWINGS

FIG. 2. is an end view of the fixture shown in FIG. 1.

FIG. 3. is a plan view of the fixture shown in FIG. 1.

FIG. 4. is a cross-section taken along the lines 4—4 of FIG. 3.

DETAILED DESCRIPTION OF THE PREFERRED EMBODIMENT

Figure 1:
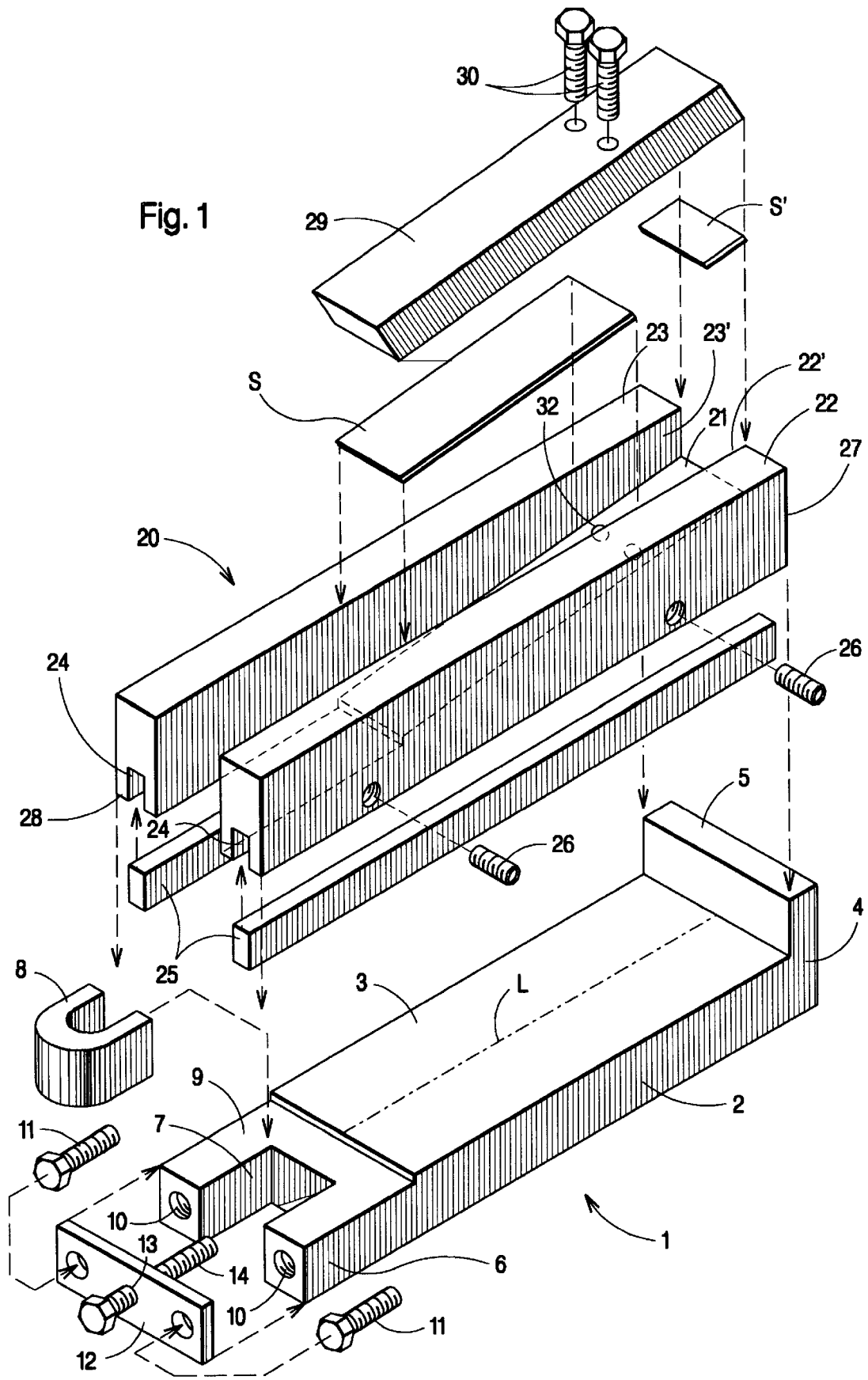
FIG. 1. is an exploded view of the preferred apparatus for determining coating.

Referring to FIG. 1 of the drawings, the preferred apparatus for carrying out the steps of the invention for determining coating thickness is shown comprising a cooperating jig 1 and fixture 20 arrangement that positions, and holds in a predetermined position, a specimen for wet or dry grinding a measuring surface along a portion thereof. The jig portion of the apparatus includes a plate or bar 2 having a planer surface 3 for receiving fixture 20. Bar 2 includes a first end 4 having a fixed stop 5, and a second end 6 having an opening 7 for receiving a moveable stop 8. The second end portion further includes a planer surface 9 that is parallel to, and extends outward from, planer surface 3 of bar 2. Threaded apertures 10 are provided in the second end to receive fasteners 11 that attach a cover plate 12 to the second end of the jig. Cover plate 12 extends across opening 7 at a position that captures the moveable stop 8 within opening 7, and the cover plate includes a threaded aperture 13 for receiving an adjustment screw 14 that bears against stop 8 to clamp the moveable stop within the opening. Adjustment screw 14 can be rotated to move stop 8 in a direction either toward or away from the fixed stop 5 located at the opposite end 4 of bar 2. This is done in combination with inserting shims as disclosed in more detail later.

Referring to FIGS. 1 and 2, fixture 20 comprises an inclined plane 21 that extends between spaced apart side members 22 and 23. Each side member 22 and 23 includes a channel 24 that extends along a bottom portion thereof to receive skids 25. The skids are held within the channels by fasteners 26. Skids 25 are made from an abrasion resistant material, for example silicon carbide, and skids 25 extend outward from channels 24 to support fixture 20 when the fixture is placed on a surface. The inclined plane portion of the fixture extends in a downward direction from a first end 27 of fixture 20 toward a second end 28 of the fixture. Threaded apertures 32 are provided for attaching a clamp block 29 to the inclined plane 21 with fasteners 30. The fastened clamp block holds the specimen at a predetermined position in the fixture for grinding and measuring.

Referring to the drawings in FIGS. 3 and 4, skids 25 elevate fixture 20 above planer surface 3 of the jig, and the first end 27 of fixture 20 contacts the fixed stop 5. Movable stop 8 is clamped within opening 7 at the second end portion of bar 2 by rotating the adjustment screw 14 to force stop 8 against a wall that defines opening 7. The coated, or film side, of the composite specimen S is placed face down on the inclined plane 21 of fixture 20 with specimen S edge portion 31 bearing against moveable stop 8. Fixture 20 is positioned parallel to the longitudinal axis "L" of jig 1 by squaring first end 27 against fixed stop 5. Specimen S is positioned to extend end portion 31 above planer surface 9 located at the end portion 6 of bar 2 and contact the moveable stop 8. A shim plate S', normally cut from the specimen being measured, is placed on the inclined plane 21 opposite end 31 to prevent canting when clamp block 29 is attached with fasteners 30 to hold specimen S in place. In the preferred embodiment, movable stop 8 is magnetic to facilitate holding the end portion 31 of the specimen in position against the moveable stop 8 while clamp block 29 is fastened. It should be understood, however, that a non-magnetic moveable stop 8 could be used for positioning specimen S without departing from the scope of this invention.

Figure 5:
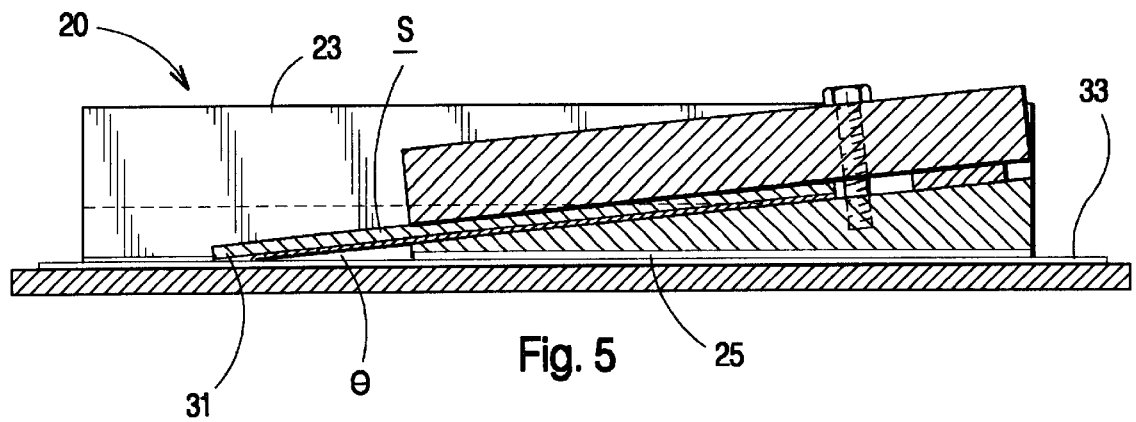
FIG. 5. is a cross-section similar to FIG. 4 showing the grinding step.

Referring now to FIG. 5, after specimen S is clamped at a predetermined position within the fixture, fixture 20 is removed from jig 1 and placed on a grinding surface 33 to grind a measuring surface on a diagonal plane across coating layers applied to the specimen. Skids 25 elevate fixture 20 above the abrasive surface 33 of the grinder to prevent the grinder from damaging the side members 22 and 23, and end 31 of the specimen extends outward from the fixture to contact the surface of the grinder at an angle θ that is predetermined by the slope of the inclined plane 21. In the preferred embodiment, angle θ is 30° to make it convenient for users to determine coating thickness by simply multiplying the measurements by the sine of 30°. However, it should be understood that the scope of the invention is not limited to using a 30° inclined plane. The slope of the inclined plane can be any reasonable angle without departing from the scope of the invention.

Figure 11:
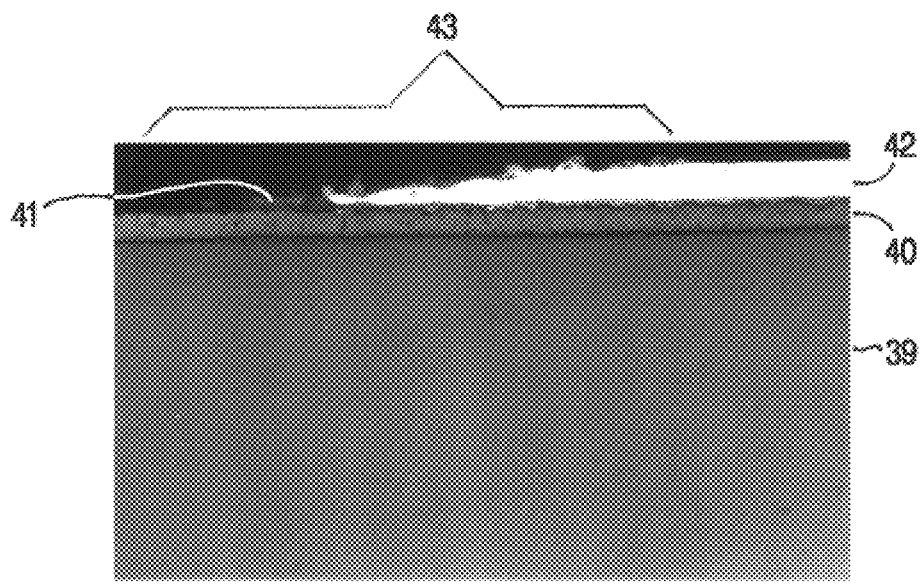
FIG. 11. is a photomicrograph showing a measuring surface prepared with the Tooke cutting tool.

The above step of grinding a prepared measuring surface that extends across the different layers of a composite material improves accuracy when determining coating thickness. The improvement is clearly seen by comparing the photomicrographs shown in FIGS. 11 and 12. FIG. 11, labeled Prior Art, shows a cross-section of coated steel sheet magnified at 200×. The cross-section is taken perpendicular to the cut in a specimen prepared for thickness measurement using the Tooke gauge, and the specimen comprises a steel substrate 39, a Galvalume (metallic coating) 40 bonded to the surface of the substrate, a primer coat 41, and a painted topcoat 42. As heretofore stated, Tooke teaches forcing a cutting tool through the film or to cut a groove for measuring thickness. When a cutting tool is forced through an organic coating, for example a paint layer, the blade motion through the organic coating causes plastic deformation and elastic springback along the length of the cut. Similarly, when a cutting tool is forced through a metallic coating, such as a zinc or a zinc alloy coating, the blade motion causes plastic deformation and permanent alloy deformation along the cut. The shape of the surface formed by the cutting process is dependent upon the elastic and plastic properties of the layers being cut. Referring again to FIG. 11, such plastic distortion is clearly visible along the Tooke cut surface 43, and such deformation prevents accurate measurement and determination of coating thickness.

Figure 12:
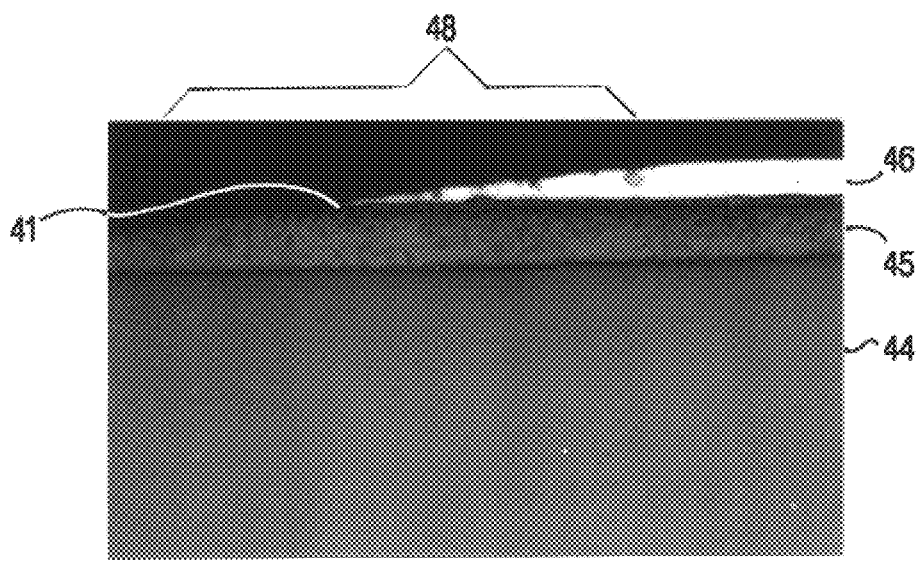
FIG. 12. is a photomicrograph showing a measuring surface prepared with a grinding tool.

Wet or dry grinding, on the other hand, eliminates or greatly reduces plastic deformation as compared to the deformation made with a cutting tool. To illustrate, FIG. 12 shows a second cross-section of coated steel sheet magnified at 200×. However, the measuring surface for this sample was prepared with a grinder rather than a cutting tool. The specimen in FIG. 12 also comprises a steel grade substrate 44 as shown in FIG. 11, a Galvalume coating 45, a primer coat 46, and painted topcoat 47. The photomicrograph clearly shows that grinding a measuring surface on a coated specimen eliminates, or at least greatly reduces, plastic deformation along the measuring surface 48. This enables an observer to better discern boundary edges between the different coating layers and thereby improve accuracy in determining coating or film thickness, as compared to a specimen prepared with a cutting tool.

Figure 6:
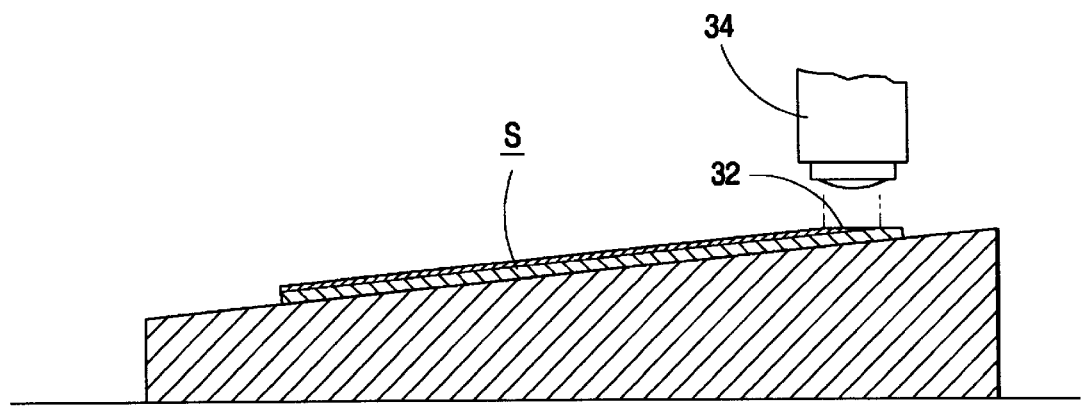
FIG. 6. is a cross-section showing the measuring step.

When the grinding step is completed, clamp block 29 is loosened and specimen S is rotated 180° to an inclined position that places the prepared measuring surface 32 in an upward horizontal plane for viewing from above with a measuring device such as a microscope 34 as shown in FIG. 6. Because the measuring surface 32 is in a horizontal plane parallel to the focal plane of the measuring device 34, it can be viewed at very high magnification to determine coating thickness. This is because the viewing focal plane and measuring plane 32 are parallel, and this enables the entire measuring surface to fall within the shallow depth of field created with higher magnification. As the viewing magnification is increased, it becomes easier for the observer to discern boundary edges between the different coating layers in a composite material and more accurately measure distance across the coating layers to determination of coating thickness. This is an improvement over prior teaching, for example Tooke, where the plane of the cut surface intersects the focal plane of the microscope. In such instances, magnification must be decreased in order to increase the depth of field and keep the sloped cut surface in focus. Lower magnification makes it more difficult for the observer to discern boundary edges, and as a result, produces less accurate thickness measurements.

Figure 7:
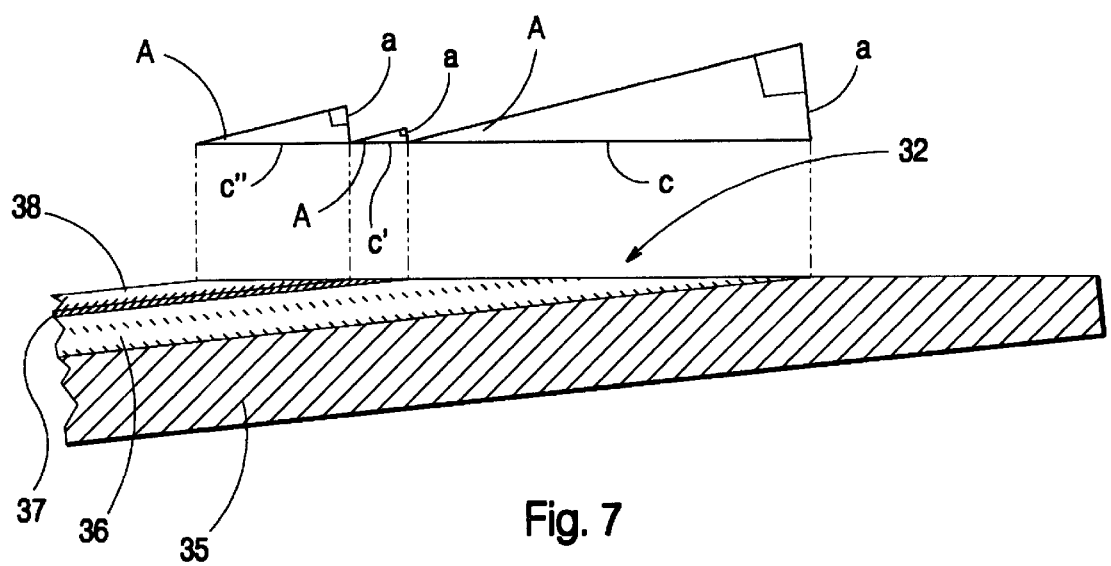
FIG. 7. is an enlarged portion of FIG. 6.

Referring to the enlarged cross-section in FIG. 7, a typical prepainted Galvalume sheet comprises a steel sheet substrate 35, a zinc alloy coating 36 bonded to the substrate, a primer coat 37, and a painted topcoat 38. In order to determine the thickness of the three different coating layers, the distance along side-c, side-c', and side-c" of each 30° right triangle shown for the three layers, is measured using a microscope at a high magnification, for example 100×. Sides c-c" represent the respective distances between the boundary edges of the three coatings. Each distance measurement is multiplied by the sine of angle A to determine side-a of the triangle, which represents the respective coating thickness. Such information can be easily applied to coating weight standards as shown in Table A below to determine whether a coated product meets specification, and the coating line can be adjusted accordingly. To illustrate, if a customer orders ASTM AZ60 prepainted Galvalume sheet, the ASTM specification indicates that the sum of the Galvalume coating weights for both sides of the double coated AZ60 sheet must equal a total coating weight of 183 g/m².(91.5 g/m²/side). Therefore, an operator can spot check the Galvalume coating by measuring the finished product, as disclosed above, to determine if the coating thickness agrees with the matching ½(1.92 mil) or 0.96 mil coating thickness specified in the ASTM standard. For example, referring to FIG. 7, if side-c, shown extending between the edge boundaries of the Galvalume coating 36 in the figure, measures 9.60 mils, the operator can quickly calculate that the Galvalume coating is 0.96 mils thick by multiplying the measured distance side-c by 0.1 (sine of 30°). Therefore, in this instance, the product meets specification. Conversely, if side-c fails to measure 9.60 mils, the operator knows that the finished product does not meet specification and the coating line can be adjusted accordingly. Likewise, the primer coat can be measured along side-c' to spot check primer coat quality. A typical target thickness for a primer coat is about 0.25 mils. Therefore, when measured using the apparatus and steps taught above, side c' should measure about 2.50 mils when viewed with the microscope. Similarly, a typical target thickness for a painted topcoat is about 0.75 mils. When viewed under magnification, the topcoat side c" should measure about 7.50 mils.

Figure 8:
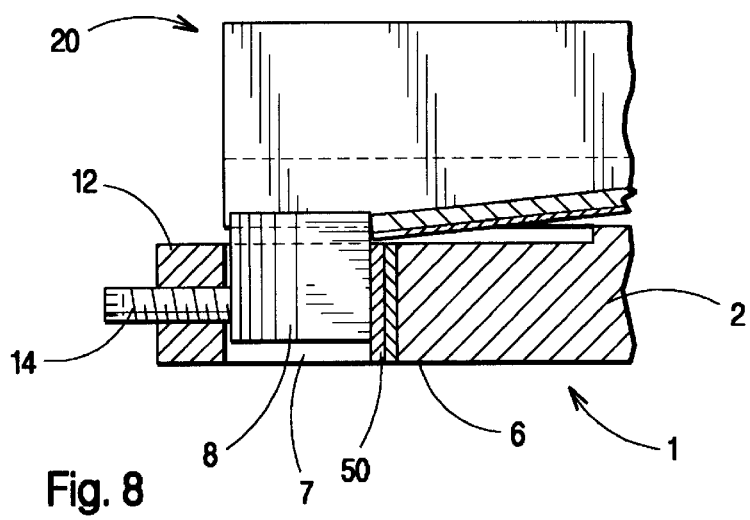
FIG. 8. is an enlarged portion of the movable stop in FIG. 4.

Referring to FIG. 8, an enlarged view of the second end portion 6 of jig 1, the moveable stop 8 can be adjusted to establish bounds that fit different ranges of coating thickness by inserting shim plates 50 between stop 8 and a wall defining opening 7. One or more shims 50 are inserted between the moveable stop 8 and the opening wall to move stop 8 in a direction away from bar 2. This positions more of the end material 31 below the level of jig surface 3 when the specimen engages the stop, and enables a user to control the amount of specimen material that is removed by grinding when a measuring surface 32 is prepared. In a like manner, one or more shims are removed to move stop 8 in a direction toward bar 2 to position less end material 31 below the level of jig surface 3. Such adjustment controls the amount of material that is removed with respect to either thicker or thinner coatings applied to a substrate.

Figure 9:
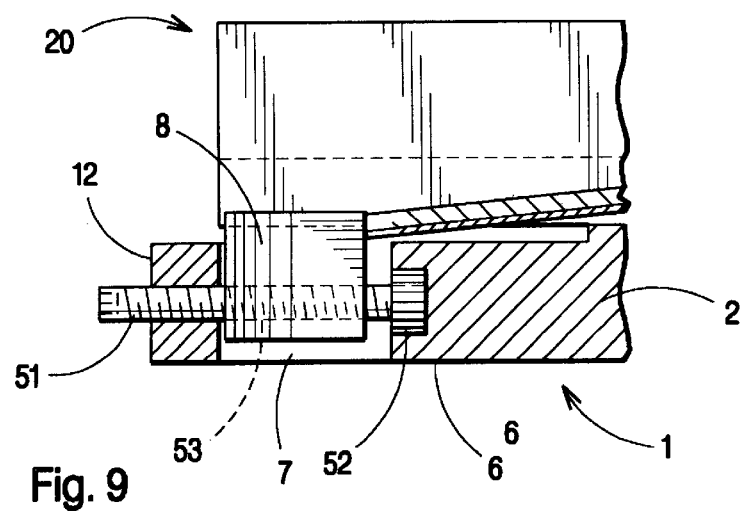
FIG. 9. is an alternate embodiment of the movable stop in FIG. 8.

An alternate moveable stop for adjusting the amount of end material 31 that is positioned below the level of jig surface 3 is shown in FIG. 9. The alternate embodiment comprises an opening 7 similar to the opening in FIG. 1, a moveable stop 8, and a cover plate 12 fastened to the second end portion 6 of jig 1. An adjustment screw 51 is rotatably mounted in bar 2 by a bearing or bushing 52 and extends through an aperture 53 in cover plate 12 to engage a threaded aperture 54 extending through the moveable stop 8. When the adjustment screw 51 is rotated in either a left-hand or a right-hand direction, stop 8 moves either toward or away from bar 2 to provide adjustment for end 31 as described above with the shim embodiment.

Figure 10:
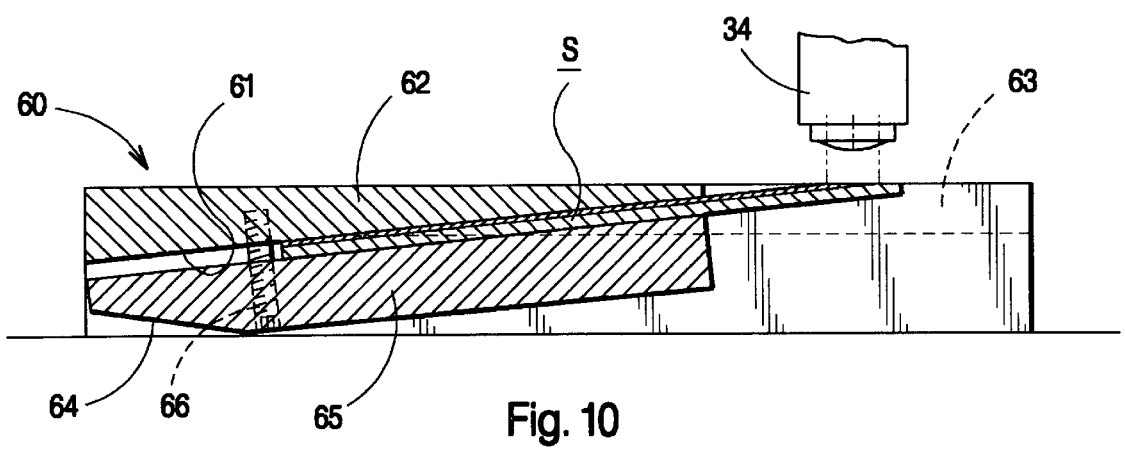
FIG. 10. is a cross-section showing an alternate fixture embodiment.

An alternate fixture embodiment is shown in FIG. 10. The alternate fixture 60 comprises an inclined plane 61 that extends between the spaced apart side members 62 similar to the side members shown in FIGS. 1 and 2. Each side member includes a channel that extends along the bottom portion thereof to receive skids 63 as disclosed above, and clamp block 65 includes a beveled end 64. Additionally, clamp block 65 is fastened in a clamping position with countersunk fasteners 66. The beveled end 64 and the countersunk fasteners 66 provide clearance for inverting the entire fixture so that clamped specimen S can be viewed from above with a measuring device 34 after the grinding step has been completed. This simplifies measuring the specimen by eliminating a need for loosening clamp block 65 and repositioning specimen S at an inclined position as disclosed above and shown in FIG. 6.

Although the preferred embodiment discloses apparatus and a method for grinding, measuring, and determining coating thickness on steel sheet and strip products, it should be understood that the apparatus and method of this invention is intended to have application outside the coated steel product industry. For instance, the apparatus and method of this invention has utility in the electronic industry where it is necessary to measure coating thickness on circuit boards. Likewise, in the composite industry, the apparatus and method is suited for measuring thickness in multi-layered sheets, for example fiberglass, that are intermixed with adhesive compounds. Additionally, while this invention has been described as having a preferred design, it is understood that it is capable of further modifications, uses, and/or adaptations following in general the principle of the invention and including such departures from the present disclosure as come within known or customary practice in the art to which the invention pertains, and as may be applied to the essential features set forth herein, and fall within the scope of the invention limited by the appended claims.

TABLE A

METALLIC COATING THICKNESS (2-SIDES)

| COATING WEIGHT | GALVALUME | | GALVANIZED | | ALUMINUM COATED | | GALFAN | |
|---|---|---|---|---|---|---|---|---|
| oz/ft$^2$ | mils | ASTM | mils | ASTM | mils | ASTM | mils | ASTM |
| 2.35 | 7.52 | — | 3.95 | G235 | 8.79 | — | 4.12 | GF235 |
| 2.10 | 6.72 | — | 3.53 | G210 | 7.85 | — | 3.68 | GF210 |
| 1.85 | 5.92 | — | 3.11 | G185 | 6.92 | — | 3.24 | GF185 |
| 1.65 | 5.28 | — | 2.77 | G165 | 6.17 | — | 2.89 | GF165 |
| 1.40 | 4.48 | — | 2.35 | G140 | 5.24 | — | 2.46 | GF140 |
| 1.15 | 3.68 | — | 1.93 | G115 | 4.30 | — | 2.02 | GF115 |
| 1.00 | 3.20 | — | 1.68 | — | 3.74 | T2 100 | 1.75 | — |
| 0.90 | 2.88 | — | 1.51 | G90 | 3.37 | — | 1.58 | GF90 |
| 0.75 | 2.40 | — | 1.26 | — | 2.81 | — | 1.32 | GF75 |
| 0.65 | 2.08 | — | 1.09 | — | 2.43 | T2 65 | 1.14 | — |
| 0.60 | 1.92 | AZ60 | 1.01 | G60 | 2.24 | — | 1.05 | GF60 |
| 0.55 | 1.76 | AZ55 | 0.92 | — | 2.06 | — | 0.97 | — |
| 0.50 | 1.60 | AZ50 | 0.84 | — | 1.87 | — | 0.88 | — |
| 0.45 | 1.44 | — | 0.76 | — | 1.68 | — | 0.79 | GF45 |
| 0.30 | 0.96 | — | 0.50 | G30 | 1.12 | — | 0.53 | GF30 |

What is claimed is:

1. A jig and fixture device for holding the coated surface of a substrate at a fixed position to prepare the coated surface for coating thickness measurement, comprising:
   a) a jig including an adjustable stop to limit the position of the coated surface of a substrate being prepared for coating thickness measurement; and
   b) a fixture coupled to said jig and including;
      i) an inclined plane for supporting a substrate being prepared for coating thickness measurement, said inclined plane extending toward said adjustable stop at a predetermined angle θ, said inclined plane having a first end remote from said adjustable stop providing a space therebetween so that when a substrate is supported on said inclined plane in engagement with said adjustable stop, a coated surface of the substrate extends across said space; and
      ii) at least one clamp to hold the coated surface of the substrate fast to said inclined plane so that said fixture and the fastened substrate can be uncoupled from said jig to prepare the coated surface for coating thickness measurement.

2. The apparatus recited in claim 1 wherein said jig comprises:
   a) a first end having a fixed stop opposite said adjustable stop, said fixed stop positioned to engage said fixture coupled to said jig; and
   b) a second end including;
      i) an opening adapted to receive said adjustable stop; and
      ii) means to position said adjustable stop at different locations within said opening.

3. The apparatus recited in claim 2 wherein said means to position said adjustable stop includes:
   a) at least one shim positioned between said adjustable stop and a wall defining said opening.

4. The apparatus recited in claim 2 wherein said means to position said adjustable stop is a threaded rod engaging said adjustable stop.

5. The apparatus recited in claim 4 wherein said threaded rod is fastened to said jig and said adjustable stop travels along a length of said threaded rod within said opening when said threaded rod is rotated.

6. The apparatus recited in claim 5 wherein said adjustable stop is magnetic.

7. The apparatus recited in claim 1 wherein said fixture includes an abrasion resistant bottom surface.

8. The apparatus recited in claim 7 wherein said inclined plane extends between a first side member and a second side member.

9. The apparatus recited in claim 8 wherein said first side member includes a skid having an abrasion resistant bottom surface and said second side member includes a skid having an abrasion resistant bottom surface.

10. The apparatus recited in claim 1 where said predetermined inclined plane angle is 30°.

11. The method recited in claim 1 wherein said adjustable stop is magnetic.

12. Apparatus for supporting the coated surface of a substrate to prepare said coated surface for thickness measurement, comprising:
   a) a combination jig and fixture where said jig includes a moveable stop that fixes a position of said coated substrate supported on said fixture, and
   b) said fixture includes an inclined plane for supporting the coated substrate, said inclined plane having a first end spaced apart from said movable stop to provide a gap therebetween so that said supported coated substrate spans said gap and engages said adjustable stop at a predetermined angle to prepare the coated surface for thickness measurement.

13. The apparatus recited in claim 12 comprising:
   a) a clamp to hold a coated substrate fast against said inclined plane so that said fixture can be separated from said jig to prepare the coated surface for thickness measurement.

14. The apparatus recited in claim 12 wherein said inclined plane is 30°.

15. The apparatus recited in claim 12 wherein said moveable stop is magnetic.

16. A method for determining a coating thickness on a substrate comprising:
   providing a jig having an adjustable stop;
   coupling a fixture to said jig so that an inclined plane provided in said fixture extends toward said adjustable stop at a predetermined angle θ, said inclined plane having a first end remote from said adjustable stop to provide a space therebetween;
   placing a coated substrate on said inclined plane so that a surface of the coated substrate extends across said space when said coated substrate engages said adjustable stop;
   clamping the coated substrate to said inclined plane;
   uncoupling said fixture from said jig;
   preparing a measuring surface along said first coated end extending outward from said fixture;
   repositioning the coated substrate on said fixture to place said prepared measuring surface in a plane parallel to focal plane of a measuring device used to determine coating thickness;
   measuring said prepared surface;
   determining coating thickness based upon said measurement.

17. The method recited in claim 16 including:
   moving said adjustable stop to a selected position to engage said first coated end extending outward from said fixture.

18. The method recited in claim 16 including:
   placing the coated surface to be measured for coating thickness face down on said inclined portion.

19. The method recited in claim 18 including:
   preparing said measuring surface along said face down coated surface.

20. The method recited in claim 19 wherein said prepared measuring surface along said face down coated surface is parallel to a bottom surface of said fixture.

21. The method recited in claim 19 wherein said inclined plane is 30°.

* * * * *